United States Patent
Scott et al.

(10) Patent No.: US 9,131,415 B2
(45) Date of Patent: Sep. 8, 2015

(54) METHOD FOR CONTROLLING COMMUNICATION SERVICE IN A TELECOMMUNICATION AND COMMUNICATOR ASSOCIATED THEREWITH

(75) Inventors: Frank Scott, Pakenham (CA); Pierre Lescuyer, Montigny le Bretonneaux (FR); Philippe Cassuto, Neuilly sur Seine (FR); Susan Martin, Van Alstyne, TX (US); Michael Thomas, Plano, TX (US); Carole Tomatis, Boulogne Billancourt (FR)

(73) Assignee: Alcatel Lucent, Boulogne-Billancourt (FR)

( * ) Notice: Subject to any disclaimer, the term of this patent is extended or adjusted under 35 U.S.C. 154(b) by 2180 days.

(21) Appl. No.: 10/579,881

(22) PCT Filed: Nov. 15, 2004

(86) PCT No.: PCT/EP2004/012927
§ 371 (c)(1),
(2), (4) Date: Mar. 7, 2007

(87) PCT Pub. No.: WO2005/051028
PCT Pub. Date: Jun. 2, 2005

(65) Prior Publication Data
US 2007/0173239 A1 Jul. 26, 2007

(30) Foreign Application Priority Data
Nov. 18, 2003 (FR) ...................................... 03 13513

(51) Int. Cl.
*H04W 4/00* (2009.01)
*H04W 36/00* (2009.01)
(Continued)

(52) U.S. Cl.
CPC ..... *H04W 36/0066* (2013.01); *H04L 29/06027* (2013.01); *H04L 65/80* (2013.01); *H04W 88/181* (2013.01); *H04W 36/28* (2013.01)

(58) Field of Classification Search
CPC .............................. H04W 36/00; H04W 4/00
USPC ........ 370/328; 455/432.1, 436, 437, 438, 439
See application file for complete search history.

(56) References Cited

U.S. PATENT DOCUMENTS 6,262,978 B1 * 7/2001 Bruno et al. .................. 370/260
7,096,020 B2 * 8/2006 Choi et al. .................... 455/439

(Continued)

FOREIGN PATENT DOCUMENTS

EP 1439725 7/2004
EP 1439725 A1 * 7/2004

(Continued)

OTHER PUBLICATIONS

ETSI: "Handover Requirements between UMTS and GSM or other Radio Systems (3G TS 22.129 Vs. 3.2.0)" European Telecommunication Standard, XX,XX, Dec. 1999 p. 1-20.

*Primary Examiner* — Marcos Batista
(74) *Attorney, Agent, or Firm* — Patti & Malvone Law Group, LLC

(57) ABSTRACT

A mobile first terminal (1) has a call in progress with a second terminal (2) under a first communications service via a base station (10) of the access network of a first subsystem. A condition for transferring the call to a base station (20) of the radio access network of a second subsystem is detected in a radio network controller (11) of the first subsystem. A core network switch (12) which is linked to the radio network controller (11) of the first subsystem is informed of said detection of a call transfer condition. If the second subsystem cannot process the call under the first communications service, a service change is requested so that said call can continue under the second communications service.

27 Claims, 3 Drawing Sheets

(51) Int. Cl.
*H04L 29/06* (2006.01)
*H04W 88/18* (2009.01)
*H04W 36/28* (2009.01)

(56) References Cited

U.S. PATENT DOCUMENTS

2002/0085514 A1   7/2002   Illidge et al.
2003/0114158 A1*  6/2003   Soderbacka et al. .......... 455/436
2004/0218035 A1*  11/2004  Crook ........................ 348/14.02

FOREIGN PATENT DOCUMENTS

| SE | 1439725 | * | 7/2004 | ............... H04Q 7/38 |
| WO | WO 02/19753 A | | 9/2000 | |
| WO | WO 02/01902 A | | 1/2002 | |

* cited by examiner

METHOD FOR CONTROLLING COMMUNICATION SERVICE IN A TELECOMMUNICATION AND COMMUNICATOR ASSOCIATED THEREWITH

TECHNICAL FIELD

The present invention relates to controlling circuit mode communications services in a telecommunications system and more particularly to monitoring communications services using different ways of coding speech in a heterogeneous telecommunications system.

BACKGROUND

In digital landline telephone systems, speech is digitized, encoded to a standard law used in public networks (in particular the A and µ laws), and conveyed by 64 kilo bits per second (kbps) circuits. In radio communications systems it is generally necessary to reduce this bit rate, in particular at the radio interface. To this end radio terminals incorporate a speech compression function.

In some systems, such as the Global System for Mobile communications (GSM), which is a second generation (2G) radio communications system, speech is transported in compressed form in the radio access network between base stations and a transcoder and rate adapter unit (TRAU) located between the radio access network and the core network, usually in 16 kbps pulse code modulation (PCM) channels, a PCM channel corresponding on the radio interface to one full rate speech channel or to two half-rate channels, for example. The TRAU transcodes speech between the 64 kbps coding law A and the full rate or half-rate code.

Other systems, such as the Universal Mobile Telecommunications System (UMTS), which is a third generation (3G) radio communications system, offer circuit mode communication with an end-to-end bit rate of 64 kbps. This caters in particular for videotelephone calls, which require a higher bit rate than telephone calls and therefore cannot be supported adequately by second generation systems.

Speech coding/decoding for videotelephone calls at an end-to-end bit rate of 64 kbps, for example, may be carried out in accordance with the H.324 standard, which is described in ITU-T Recommendation H.324, including appendix C thereof ("Multimedia telephone terminals over error prone channels") and where appropriate appendix H thereof ("Mobile multilink operation"), which covers this kind of coding/decoding. Technical Specification TS 26.111, version 5.0.0, "Codec for Circuit-switched Multimedia Telephony Service; Modifications to H.324", published in June 2002 by the 3$^{rd}$ Generation Partnership Project (3GPP), which is more specifically adapted to UMTS terminals, also covers this kind of coding/decoding.

Since it conveys voice and video simultaneously, a videotelephone call necessitates a high transmission bit rate, which the UMTS can offer. In contrast, the GSM generally proves unable to support videotelephone calls since the maximum bit rate authorized on its radio segment is too low for this purpose.

A problem arises in heterogeneous radio communications systems, for example a system comprising second generation (GSM) plant and third generation (UMTS) plant, because a terminal may initiate a videotelephone call when it is under the control of 3G plant, which call cannot continue if the terminal is transferred (handed over) to the control of 2G plant, for example as a result of the terminal moving to an area in which no 3G plant is available. The videotelephone call is then cut off, which is particularly frustrating for the user.

SUMMARY

One object of the present invention is to limit the drawbacks referred to above by proposing at least partial call continuity in a heterogeneous system, for example continuity of its voice portion.

Another object of the invention is to propose a service change adapted to retain the voice portion of a videotelephone call on transfer of the call between radio communications equipments of different generations.

A further object of the invention is to propose a service change adapted to retain only the voice portion of a videotelephone call on transfer of the call between radio communications equipments of different generations without excessively degrading the quality of the voice call on transfer.

The invention therefore proposes a method of controlling communications service in a telecommunications system comprising first and second subsystems each including a radio access network comprising base stations and a radio network controller connected to at least some of said base stations and to a core network switch, the first subsystem being adapted to support first and second communications services and the second subsystem being adapted to support the second communications service, the method comprising the following steps in the case of a first mobile terminal having a call in progress with a second terminal under the first communications service via a base station of the radio access network of the first subsystem:

the radio network controller of the first subsystem detecting a call transfer condition for transferring the call to a base station of the radio access network of the second subsystem;

informing the core network switch to which the radio network controller of the first subsystem is connected of said detection of a call transfer condition; and if the second subsystem is not adapted to process the call under the first communications service, requesting a service change in order for said call to continue under the second communications service.

Thus a service change is effected before executing the call transfer to enable fallback ahead of time to a mode of operation supported by the second subsystem.

The first subsystem may be a third generation subsystem and the second subsystem a second generation subsystem, for example, and the first communications service may be a videotelephone service and the second communications service a voice telephone service. In this case, the video component of the call will be stopped before transferring the call to the 2G subsystem and the audio component will be retained. This achieves some degree of call continuity, which could not have been achieved if the service change had not been effected before executing the call transfer.

A coding change advantageously accompanies the communications service change, the new form of coding being selected to enable use of the second communications service and to be supported by the second subsystem. For example, the coding associated with the first communications service is compatible with the H.324 standard and the coding associated with the second communications service is of the Adaptive MultiRate (AMR) type.

The inability of the second subsystem to process the call under the first communications service may be detected at the switch connected to the radio network controller of the first subsystem following transmission of a request to transfer the call to a switch connected to the radio network controller of the second subsystem and reception in response thereto of a transfer failure message.

On receiving a transfer failure message relayed from the switch to which it is connected, the radio network controller of the first subsystem advantageously attempts to initiate the call transfer procedure again, advising the switch of the continuing detection of a call transfer condition. A transfer failure message continues to be sent to the radio network controller until the service change procedure is completed. When the service change procedure has been completed, the call can then be transferred in the normal way, the risk of failure being eliminated by virtue of the prior service change in respect of the call.

The invention also proposes a core network switch of a telecommunications system comprising first and second subsystems each including a radio access network comprising base stations and a radio network controller connected to at least some of said base stations, at least some of the radio network controllers also being connected to said core network switch, the first subsystem being adapted to support first and second communications services and the second subsystem being adapted to support the second communications service, said core network switch comprising, in relation to a first mobile terminal having a call in progress with a second terminal under the first communications service via a base station of the radio access network of the first subsystem:

means for receiving an indication that the radio network controller of the first subsystem has detected a call transfer condition for transferring the call to a base station of the radio access network of the second subsystem; and means for requesting a service change in order for said call to continue under the second communications service if the second subsystem is not adapted to process the call under the first communications service.

Other features and advantages of the present invention emerge from the following description of non-limiting embodiments of the invention, which is given with reference to the appended drawings, in which:

DETAILED DESCRIPTION

Figure 1:
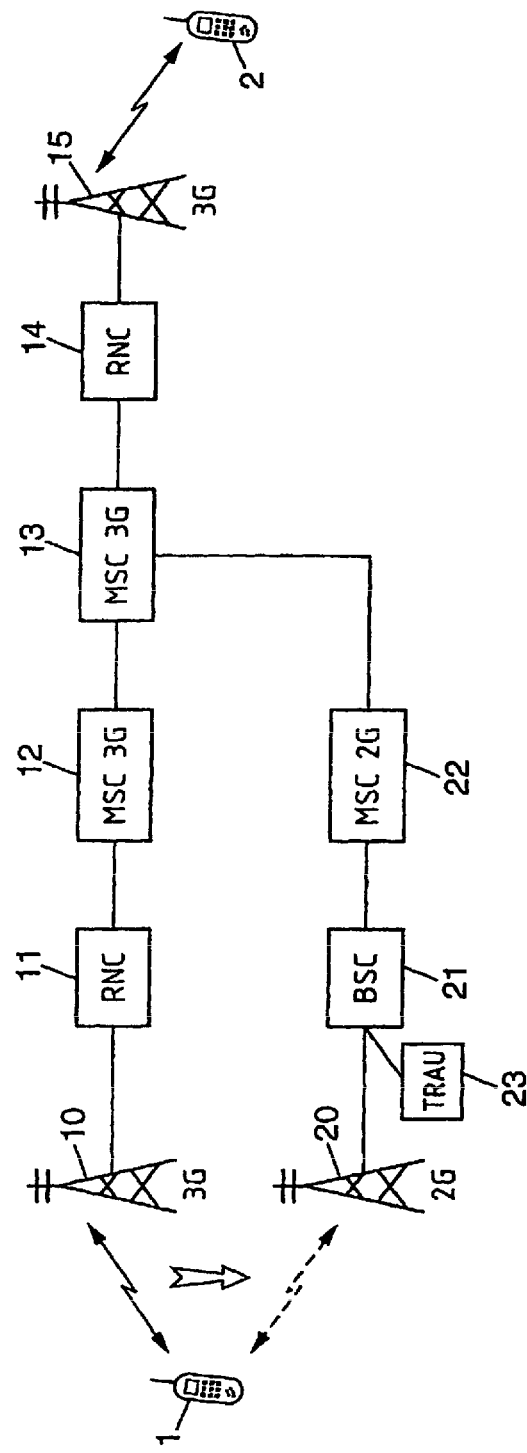
FIG. 1 is a simplified diagram of one example of a telecommunications system architecture in which the invention may be used.

FIG. 1 is a diagram of a telecommunications system architecture in which the invention may be used. Radio terminals 1 and 2 are mobile terminals supporting the UMTS third generation radio communications system. A call between these two terminals is advantageously effected via 3G plant, at least some of which forms a subsystem of the telecommunications system that comprises a radio access network with a 3G base station 10 with which the terminal 1 communicates over a radio interface and a radio network controller (RNC) 11 controlling the base station 10 and the call involving the mobile terminal 1. The RNC 11 is also connected to a 3G mobile-service switching centre (MSC) 12 of the core network.

A call is in progress between a mobile terminal 1 and a terminal 2. A mobile terminal is also referred to as a user equipment (UE). If the terminal 2 is also a mobile terminal (denoted UE 2), the call is routed via other 3G plant at the UE 2 end, such as an MSC 13 and an RNC 14 connected to the MSC 13 and controlling a 3G base station 15 to which UE 2 is connected.

The following description refers by way of example to a point-to-point call between UE 1 and 2, although it is equally feasible for a call to involve a greater number of terminals, for example UE 1 and two or more other terminals. The call referred to below is effected in circuit mode, meaning that a circuit is reserved for exchanges between the UE via 3G plant.

Moreover, and as indicated in the introduction, UE 1 and 2 have a protocol stack that supports coding of the call frames exchanged. The form of coding used may depend on the required bit rate and a required quality of service. It may equally depend on the type of service to be provided during the call. If the communications service envisaged is a videotelephone service, i.e. a service involving simultaneous transmission of video and audio, the form of coding selected must allow for transmission at a high bit rate to authorize a large quantity of information to be conveyed fast. In contrast, if the service is a voice telephone service, a form of coding that provides transmission at a lower bit rate may be selected.

One example of a protocol suite enabling call coding that may be used by the UE to communicate via the UMTS is the H.324 standard conforming to ITU-T Recommendation H.324, including appendix C thereof ("Multimedia telephone terminals over error prone channels") and where appropriate appendix H thereof ("Mobile multilink operation") or, to be more specific, the standard defined in Technical Specification TS 26.111, version 5.0.0, "Codec for Circuit-switched Multimedia Telephony Service; Modifications to H.324", published in June 2002 by the 3GPP. Said standard adapts the H.324 protocol suite to the UMTS. For simplicity, the term H.324 is used below to refer to the protocol suite applied to the UMTS.

A videotelephone call is set up between UE 1 and UE 2 using the procedures set out in section 5.3.6 of Technical Specification TS 24.008, version 5.9.0, "Mobile radio interface Layer 3 specification; Core network protocols; Stage 3 (Release 5)", published by the 3GPP in September 2003. Accordingly, if UE 1 wishes to set up a videotelephone call with UE 2, it sends a SETUP message to the MSC 12 (via the base station 10 and the RNC 11). This SETUP message indicates that UE 1 supports two modes of operation ("Bearer capability IE" ("BC IE")), one for a videotelephone service and the other for a voice telephone service. The SETUP message also contains a "Repeat indicator" parameter set to the value "support of service change and fallback". This means that UE 1 is able to support a service change and in particular fallback from a videotelephone service to a voice telephone service.

The MSC 12 then responds by sending UE 1 a CALL PROCEEDING message including an indication of the capacity of UE 2. If both modes of operation (BC) are reported in the CALL PROCEEDING message, this amounts to accepting the types of communications service requested by UE 1, namely videotelephone or speech in this example. If only one BC is included in the CALL PROCEEDING message, only one of the two communications services supported by UE 1 can be used, for example a voice telephone service.

The same type of signaling is used between the MSC 13 and UE 2. These call set-up procedures are also defined in detail in Technical Specification TS 23.172, version 5.2.0, "Technical realization of Circuit Switched (CS) multimedia service UDI/RDI fallback and service modification; Stage 2 (Release 5)", published in September 2003 by the 3GPP.

It is considered below that UE 1 has set up a circuit mode videotelephone call with UE 2 using the set-up procedures described above. This kind of call necessitates an end-to-end transmission bit rate of 64 kbps because the videotelephone service transmits a large amount of data because of the simultaneous transmission of video and audio. In this case, no transcoding is effected to reduce the usable bit rate between UE 1 and 2, in particular in the core network of the telecommunications system. A call of this kind is supported by the 3G subsystem represented in the upper portion of FIG. 1, as explained above.

UE 1 communicates with UE 2 in particular via the radio interface between UE 1 and the base station 10. The RNC 11 controls the radio resources for UE 1 in particular, in accordance with the Radio Resource Control (RRC) protocol defined in Technical Specification TS 125 331, version 5.6.0, published in September 2003 by the 3GPP. In particular, the RNC 11 detects the occurrence of certain radio conditions on the radio link between UE 1 and the base station 10 in order to initiate a procedure for transferring the call to other communications resources, known as a "handover" procedure.

Note that handover may be either "hard handover", which instantaneously switches the call from a first base station to a second, or "soft handover", in which there is a more or less lengthy stage during which the mobile communicates simultaneously with both base stations. In a soft handover, the RNC 11 maintains and updates an active set of base stations with which UE 1 is communicating at any given time. Soft handover then consists in adding base stations to that active set and/or removing them from it.

To execute the handover procedure, UE 1 and the base station 10 carry out radio measurements that include, for example, measuring uplink and downlink field levels between UE 1 and the base station 10, field levels on downlinks from stations adjoining the base station 10, for example the base station 20, and other types of measurements, for example measurements relating to uplink and downlink quality between UE 1 and the base station 10 (see section 8.4 of TS 125 331 cited above).

An RNC conventionally initiates handover if the measurements reported to it by the UE and the base station concerned indicate that a transfer condition is satisfied, for example because the current link between the UE and the base station has either too low a field level or a quality that is deemed to be too low. The RNC also decides, on the basis of the measurements reported to it, which base station is in a position to take over the call after the transfer (or to be added to the active set in the case of a soft handover).

In the FIG. 1 example, the RNC 11 detects a condition for transferring the call from the base station 10, which is a 3G unit, to the base station 20, which is a 2G unit. This situation may arise, for example, if UE 1 is initially in the vicinity of the base station 10 and then moves towards the base station. The signal level received from the base station 10 then weakens and that received from the base station 20 becomes dominant.

The base station 20 is a 2G unit. Transcoding is effected by a transcoder and rate adaptation unit (TRAU) 23 located between the base station 20 and the 2G MSC 22, for example in the base station controller (BSC) 21 controlling the base station 20. This transcoding matches a 64 kbps data stream such as exists in particular in the portion of the core network starting at the 2G MSC 22 to a stream having a lower bit rate of 16 kbps on the radio segment of the 2G subsystem so that it can be transported on a 16 kbps PCM channel. In particular, exchanges over the radio interface involving the base station 20 are effected at a usable bit rate of 9.6 kbps.

If the high speed circuit switched data (HSCSD) function is implemented in the network portion which includes the base station 20, this usable bit rate may be increased to 14.4 kbps, or even higher if a plurality of time slots are used for the same call over the radio interface for a given communication (a usable bit rate of up to 57.6 kbps can be achieved if four time slots are used).

The videotelephone call in the 3G subsystem has a bit rate of 64 kbps, as explained above. Transferring the call to the 2G subsystem which includes the base station 20 cannot be envisaged because the bit rate offered cannot support the videotelephone call.

Figure 2:
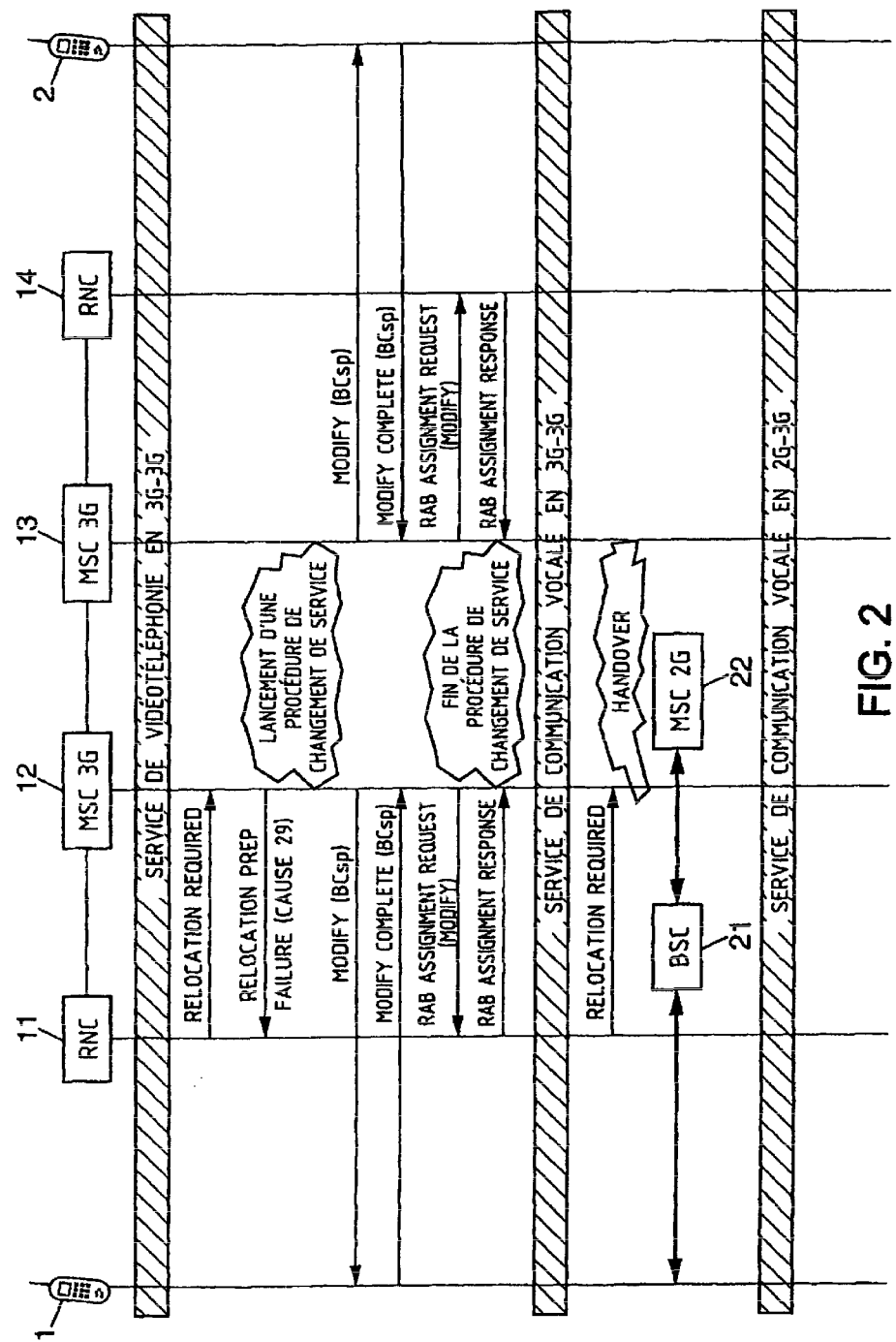
FIG. 2 represents an exchange of signaling employed by the invention.

In practice, initiating handover after detecting a condition for transferring the call from the base station 10 to the base station 20 is reflected in the sending of a request message on behalf of the RNC 11 to the MSC 12 (see FIG. 2, "RELOCATION REQUIRED"). When the request has been forwarded by the 3G MSC 12 (where applicable via an intermediary 3G MSC) to the 2G MSC 22 that is connected to the BSC 21 ("HANDOVER PREP REQ"), a failure message ("HANDOVER PREP FAILURE") is sent back from the 2G MSC 22 to the 3G MSC 12 (see Section 8.4 of technical specification TS 129 002, version 5.7.0, "Mobile Application Part (MAP) specification", published in September 2003 by the 3GPP). The MSC 12 responds to the handover request sent by the RNC 11 with a failure message (FIG. 2, "RELOCATION PREP FAILURE"), forwarding the failure message that it has itself received, with the cause 29, i.e. "RELOCATION FAILURE IN TARGET CN/RNC OR TARGET SYSTEM" (see section 8.6 of Technical Specification TS 125 413, version 5.6.0, "UTRAN Iu Interface Radio Access Network; Application Part (RANAP) signaling", published in September 2003 by the 3GPP).

Once failure of handover has been noted, for example on reception by the 3G MSC 12 of a failure message from the 2G MSC 22 or on transmission to the RNC 11 of a failure message "RELOCATION PREP FAILURE" by the 3G MSC 12, the core network initiates a procedure for modifying the communications service to change from a videotelephone service to a voice telephone service.

This kind of service change involves a change of codec, i.e. a change of the coding/decoding mode used in the core network and by UE 1 and 2. Speech coding for a voice call advantageously accommodates a much lower transmission bit rate than coding for a videotelephone call.

Figure 3:
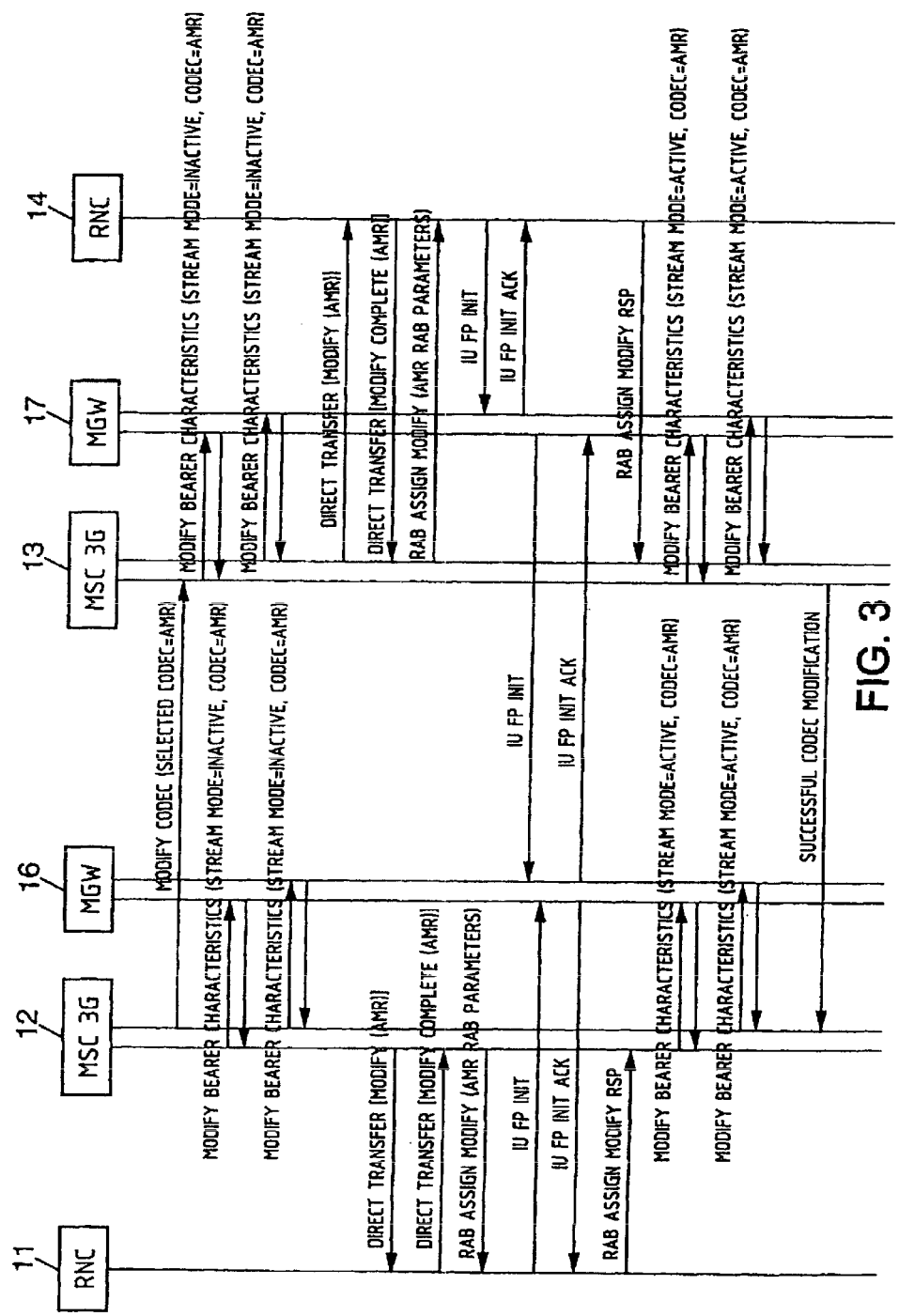
FIG. 3 represents an exchange of signaling used in a service change procedure employed by the invention.

FIG. 3 shows an example of the signaling used in the service change procedure initiated by the MSC 12, following failure of the 3G to 2G handover requested by the RNC 11.

Thus the 3G MSC 12, which is at the UE 1 end, sends a command to change codec to the 3G MSC 13, which is at the UE 2 end. This command (FIG. 3, "MODIFY CODEC") includes the codec selected to continue the call. In this example, an adaptive multirate (AMR) codec is preferably used to code the voice call. AMR codecs use eight different modes with bit rates from 12.2 kbps to only 4.75 kbps. Coding is applied to 20 milliseconds (ms) speech frames corresponding to 160 samples at a sampling frequency of 8000 samples/s. The algebraic code excited linear prediction coder (ACELP) coding scheme is used. Another example of an audio codec is the G.723.1 codec standardized by the ITU. This offers two bit rates: 5.3 and 6.3 kbps. It codes speech and other audio signals into 30 ms frames.

The core network further includes media gateways (MGW) 16 and 17 which execute and monitor coding and decoding of streams passing through them. Streams may be coded and decoded differently in the two network portions on respective opposite sides of a MGW platform (see section 5.3 of Technical Specification TS 123 153, version 5.6.0, "Out of Band Transcoder Control, Stage 2" published in September 2003 by the 3GPP). This mode of operation provides transcoding between two types of codec.

After the command to change codec is sent from the MSC 12 to the MSC 13, signaling is exchanged between the MSC 12 and the MGW 16 to which it is connected and between the MSC 13 and the MGW 17 to which it is connected. This exchange of signaling (FIG. 3, "MODIFY BEARER CHARACTERISTICS") renders the streams inactive during the service change procedure, so as to avoid that the MGW 16 and 17 generate error messages as a result of any potential inconsistency between the coding used on either side during this transitory period. On the occasion of this exchange of signaling, the MGW 16 and 17 are informed of the new codec to be adopted for continuing the call, namely an AMR codec in the FIG. 3 example. During this step, the communications medium (bearer) characteristics are modified in accordance with the envisaged service change.

The RNC 11 and 14 are then informed by the MSC 12 and 13, respectively, of the codec selected in the context of the change of codec procedure (FIG. 3, "DIRECT TRANSFER"). They then acknowledge acting on that information (FIG. 3, "DIRECT TRANSFER COMPLETE").

Note that the RNC 14 may reject a codec change request, for example because the codec selected is not supported on the radio segment extending from the RNC 14 to UE 2. In this case, the RNC 14 sends a rejection message ("DIRECT TRANSFER [MODIFY REJECT (AMR)]"), bringing about a new modification of the characteristics of the bearer negotiated between the MSC 13 and the MGW 17, in order to revert to a videotelephone codec. A codec change failure message ("CODEC MODIFICATION FAILURE") is then sent from the MSC 13 to the MSC 12. The videotelephone codec is then reselected for the segment between UE 1 and the MGW 16. Thus no service change is effected for the call in this case.

When the MSC 12 and 13 receive a "DIRECT TRANSFER COMPLETE" message, each MSC indicates to the corresponding RNC (11 or 14, respectively) that the radio access bearer (RAB) of the call must be modified to take into account the change of codec (FIG. 3, "RAB ASSIGN MODIFY"). Signaling is also exchanged over the Iu interface in the context of modifying the RAB, between the MGW 16 and the RNC 11, between the MGW 17 and the RNC 14, and between the MGW 16 and 17. After this exchange over the Iu interface, each RNC acknowledges the corresponding RAB modification indication (FIG. 3, "RAB ASSIGN MODIFY RSP").

Thereafter, signaling is again exchanged between the MSC 12 and the MGW 16 to which it is connected and between the MSC 13 and the MGW 17 to which it is connected to render the streams active again (FIG. 3, "MODIFY BEARER CHARACTERISTICS").

Finally, on completion of the above steps, the MSC 13 sends the MSC 12 an acknowledgement message to confirm the successful change of codec (FIG. 3, "SUCCESSFUL CODEC MODIFICATION"). This message announces the end of the service change procedure. In the examples shown in FIGS. 2 and 3, the call between UE 1 and UE 2, which was initially a videotelephone call, is then reduced to a voice call using an AMR audio codec over the network segments between an MGW and the corresponding UE. The voice call coded in this way then has a bit rate from 12.2 kbps to only 4.75 kbps, depending on the AMR codec mode used. It is assumed below that the AMR coding used is supported by the 2G subsystem, i.e. that it provides a usable bit rate of less than 9.6 kbps at the radio interface.

In an advantageous embodiment of the invention, the RNC 11 that has received a message reporting failure of transfer of the call to a base station of the radio access network of the 2G subsystem subsequently submits a new call transfer request (FIG. 2, "RELOCATION REQUIRED"). The MSC 12 then advantageously sends a new failure message to the RNC 11 until the change of service procedure has been completed. Thus the RNC 11 may submit many new call transfer requests.

When the change of service procedure has been completed, i.e. when the call in progress between UE 1 and UE 2 has been switched from a videotelephone service to a voice only service, a new attempt to send a call transfer request from the RNC 11 to the MSC 12 then provides for transferring the call from the 3G subsystem to the 2G subsystem represented in FIG. 1 (this is the standard 3G to 2G handover procedure).

On completion of this handover procedure, the call between UE 1 and UE 2 is routed across the 2G subsystem shown in the lower portion of FIG. 1, i.e. via the 2G base station 20, the BSC 21 and the 2G MSC 22. The 3G plant, such as the MSC 13, the RNC 14 and the base station 15 may also continue to route the call to UE 2. If the 2G MSC 22 is not connected directly to the 3G MSC 13, the call may then pass in transit through a set of MSC connecting these two MSC indirectly.

The handover procedure succeeds in this situation because a service change is effected beforehand, thus reducing the speech bit rate to a value acceptable for the 2G subsystem, i.e. a bit rate at the radio interface of less than 9.6 kbps. In particular, the same AMR codec is then used at both ends of the transmission chain, thereby assuring consistent speech coding/decoding. The voice component of the call is then retained after the call is transferred.

Because the codec change was effected ahead of call transfer and as soon as a call transfer condition was detected, continuity of service for the voice component of the call is achieved without significantly degrading its quality.

Note that if the call transfer represents a soft handover, the service change may be carried out in the manner described above as soon as a 2G base station (for example the base station 20) has been added to the active set kept up to date for UE 1.

The converse service change (from voice to videotelephone) may be carried out in accordance with the invention if the call is transferred from a region in which all plant is of the second generation to a region in which third generation plant is present. An appropriate codec is then selected to replace the initial audio codec, in order to switch from the voice only component of the call to the complete videotelephone call.

An advantageous embodiment of the invention makes good use of the bandwidth that is not used by the coded information transmitted over the call circuit of the 2G subsystem. In this way, if the audio codec used after call transfer provides a bit rate below the 9.6 kbps maximum usable bit rate authorized over the radio portion of the GSM, for example if a 4.75 kbps AMR codec is used, the remaining 4.85 kbps (9.6−4.75=4.85) may be used to transmit data in addition to the voice call.

The invention claimed is:

1. A method of controlling communications service in a telecommunications system comprising first and second subsystems, the first subsystem being adapted to support first and second communications services and the second subsystem being adapted to support the second communications service, the method comprising the following steps in the case of a first mobile terminal having a call in progress with a second terminal under the first communications service via the first subsystem:

detecting a call transfer condition for transferring the call to the second subsystem;

if the second subsystem is not adapted to process the call under the first communications service, changing service from the first communications service to the second communications service while the call is on the first subsystem and continuing the call using only the second service, where changing service further comprises changing codecs from a first codec supporting the first service to a second codec supporting the second service; and after the change of service is complete, transferring the call to the second subsystem.

2. The method according to claim 1, wherein a radio network controller of the first subsystem is connected to a core network switch and a radio network controller of the second subsystem is connected to a second core network switch, wherein, after the first switch has been informed of said detection of a call transfer condition, a request to transfer the call from the first switch to the second switch is transmitted, and wherein the inability of the second subsystem to process the call under the first communications service is indicated to the first switch by a transfer failure message sent in response to said transmission of the call transfer request.

3. The method according to claim 2 wherein said transfer failure message is sent to the first core network switch and is forwarded to the radio network controller of the first subsystem and the step of informing the first switch of detection by the radio network controller of the first subsystem of a call transfer condition for transferring the call to a base station of the radio access network of the second subsystem is repeated for as long as a transfer failure message is forwarded to the radio network controller of the first subsystem.

4. The method according to claim 1, wherein the first subsystem is of the third generation and the second subsystem is of the second generation.

5. The method according to claim 1, wherein the first communications service necessitates a higher transmission bit rate than the second communications service.

6. The method according to claim 1, wherein each communications service is associated with coding over at least a segment of the call and the service change request includes a request to change the coding over said call segment.

7. The method according to claim 6, wherein the coding associated with the first communications service is compatible with the H.324 standard.

8. The method according to claim 6, wherein the first communications service is a videotelephone service.

9. The method according to claim 1, wherein the second communications service is a voice telephone service.

10. The method according to claim 9, wherein Adaptive Multirate (AMR) coding is associated with the second communications service.

11. The method according to claim 1, wherein, if the second communications service necessitates a bit rate over a radio segment that is strictly lower than a maximum bit rate value authorized by the second subsystem, the surplus bit rate is used to transmit data via at least said base station of the radio access network of the second subsystem.

12. The method according to claim 1, wherein the service change request is transmitted to the first mobile terminal and to the second terminal.

13. The method according to claim 12, wherein the service change request is transmitted to the second terminal via at least a switch, a radio network controller and a base station to which the second terminal is connected.

14. The method according to claim 1, wherein the service change request includes a request for modification of radio access bearer characteristics of the call respectively at the mobile first terminal end and at the second terminal end; and a change from a first codec to a second codec is affected before the call is transferred, where the first codec performs coding and decoding for the first and second communications services, and the second codec performs coding and decoding for the second communications service.

15. A core network switch of a telecommunications system comprising first and second subsystems each including a radio access network comprising base stations and at least a radio network controller connected to at least some of said base stations, at least some of the radio network controllers also being connected to said core network switch, the first subsystem being adapted to support first and second communications services and the second subsystem being adapted to support the second communications service, said core network switch comprising, in relation to a first mobile terminal having a call in progress with a second terminal under the first communications service via a base station of the radio access network of the first subsystem:

means for receiving an indication that the radio network controller of the first subsystem has detected a call transfer condition for transferring the call to a base station of the radio access network of the second subsystem;

means for requesting a service change in order for said call to continue under the second communications service if the second subsystem is not adapted to process the call under the first communications service, changing service from the first communications service to the second communications service while the call is on the first subsystem and continuing the call using only the second service, where changing service further comprises changing codecs from a first codec supporting the first service to a second codec supporting the second service; and after the change of service is complete, transferring the call to the second subsystem.

16. The switch according to claim 15, wherein the radio network controller of the first subsystem is connected to said core network switch and the radio network controller of the second subsystem is connected to a second core network switch, the switch further comprising means responding to reception of an indication that a call transfer condition has been detected by transmitting a call transfer request to the second switch and means for deducing that the second subsystem is not able to process the call under the first communications service from the reception of a transfer failure message in response to transmission of said call transfer request.

17. The switch according to claim 16, further comprising means for forwarding said transfer failure message to the radio network controller of the first subsystem.

18. The switch according to claim 15, wherein the first subsystem is of the third generation and the second subsystem is of the second generation.

19. The switch according to claim 15, wherein the first communications service necessitates a higher transmission bit rate than the second communications service.

20. The switch according to claim 15, wherein each communications service is associated with coding over at least a segment of the call and the means for requesting a service change comprise means for requesting a coding change over said segment of the call.

21. The switch according to claim 20, wherein the coding associated with the first communications service is compatible with the H.324 standard.

22. The switch according to claim 15, wherein the first communications service is a videotelephone service, and wherein the second communications service is a voice telephone service.

23. The switch according to claim 15, wherein Adaptive Multi Rate (AMR) coding is associated with the second communications service.

24. The switch according to any claim 15, wherein the means for requesting a service change comprise means for transmitting a service change request to change from the first communications service to the second communications service to the mobile first terminal and to the second terminal.

25. The switch according to claim 24, wherein the means for transmitting a service change request to the second terminal are provided by at least a switch, a radio network controller and a base station to which the second terminal is connected.

26. The switch according to claim 15, wherein the means for requesting a service change include means for requesting a modification of characteristics of at least a radio access bearer of the call; and wherein a change from a first codec to a second codec is affected before the call is transferred to the second subsystem, where the first codec supports the first and second communications services, and the second codec supports the second communications services.

27. A method comprising:
controlling communications service in a telecommunications system comprising first and second subsystems, the first subsystem being adapted to support first and second communications services and the second subsystem being adapted to support the second communications service, wherein in the case of a first mobile terminal having a call in progress with a second terminal under the first communications service via the first subsystem,
detecting a call transfer condition for transferring the call to the second subsystem;
if the second subsystem is not adapted to process the call under the first communications service, changing service from the first communications service to the second communications service while the call is on the first subsystem and continuing the call using only the second service, where changing service further comprises changing codecs from a first codec supporting the first service to a second codec supporting the second service; and
after the change of service is complete, transferring the call to the second subsystem.

* * * * *